United States Patent Office 2,768,895
Patented Oct. 30, 1956

2,768,895

UREA AUTOCONDENSATION PRODUCTS

Jonas Kamlet, Easton, Conn.

No Drawing. Application October 19, 1953,
Serial No. 387,045

8 Claims. (Cl. 99—2)

This invention relates to protein supplement feeds for ruminants and, more particularly, it relates to non-protein products which may be supplied to animal fodders at moderate or low cost and are capable of being converted to organismal protein by the metabolic processes of the host animal. It has for its purpose to supply cattle and sheep growers, dairy farm and feed lot operators with low cost protein-yielding extenders and supplements, and thus to lower the cost of meat and milk production.

It has been known for some time that many non-protein nitrogenous compounds, when fed to ruminant animals, are partly converted to organismal protein. The extremely complex bacterial, fungal and protozoal microflora of the rumen are capable of converting these non-protein nitrogenous compounds into proteins, which are then digested, assimilated and converted to organismal protein (e. g. meat, milk, etc.) by the host animal. Thus, these non-protein nitrogenous compounds are capable of being used by the host animal in place of preformed protein in the animal feed.

The most widely used non-protein nitrogenous compound thus used as a protein extender or supplement in animal feeds, is urea (Bartlett & Cotton, J. Dairy Research 9, 263–272 (1938); Briggs, Gallup, Darlow, Stephens and Kinney, Journ. Animal Sci. 6, 445–460 (1945); Harris & Mitchell, Journ. Nutrition 22, 167–182, 183–196 (1941); Hart, Bohstedt, Deobald and Wegner, Journ. Dairy Sci. 22, 785–798 (1939); Kane, Jacobson & Moore, Journ. Nutrition 41, 583–596 (1950); Loosli & McKay, Journ. Nutrition, 25, 197–202 (1943); Owen, Smith & Wright, Biochem. Journ. 37, 44–53 (1943); Pearson & Smith, Biochem. Journ. 37, 142–148, 148–153, 153–164 (1943); Rupel, Bohstedt & Hart, Journ. Dairy Science 26, 647–663 (1943); Wegner, Booth, Bohstedt and Hart, Journ. Dairy Sci. 24 835–844 (1941); Willett, Henke and Maruyame, Journ. Dairy Sci. 29, 629–637 (1946); Williams & Knodt, Journ. Dairy Sci. 32, 986–992 (1949); ibid 33, 809–814 (1950); Work, Amer. Soc. Animal Prod. Proc. 404–406 (1938); Knodt, Williams & Brumbaugh, Journ. Dairy Sci. 34, 1042–1046 (1951); Thompson, Graf, Eheart & Holdaway, Journ. Dairy Science 35, 1010–1016 (1952). Ammoniated beet pulp, ammoniated molasses and ammonium bicarbonate have also been proposed as non-protein nitrogen protein extenders or supplements for animal fodders. (Hart, Bohstedt, Deobald & Wegner, Journ. Dairy Sci. 22, 785–798 (1939); Knodt, Williams & Brumbaugh, Journ. Animal Sci. 9, 661 (1950); Millar, Journ. Dairy Sci. 27, 225–241 (1944); Stiles (to Commercial Solvents Corp.) U. S. Patent 2,603,567 (1952); Comercial Solvents Corp. technical data sheet #3 on Molatein ammoniated molasses.)

In using urea and most other non-protein nitrogen compounds above described as protein extenders and supplements, a serious drawback is encountered in the fact that urea and most ammonium compounds are very soluble in water and will dissolve almost instantly in the fluid contents of the rumen. This solution is very rapidly evacuated from the rumen into the abomasum (the fourth or "true" stomach of ruminating animals). The nitrogenous compounds are there no longer available to the micro-flora of the rumen for protein production. The rapid disappearance of these soluble non-protein nitrogen compounds from the rumen largely limits the amount of protein which the host animal can produce (by symbiosis with the micro-flora of the rumen) from urea and other readily soluble nitrogenous compounds.

Nor is it possible to increase the amount of urea fed to the animal to compensate for the rapid evacuation of the soluble nitrogenous compounds from the rumen. Beyond a certain point (varying with each animal) the urea concentration will destroy or inactivate the micro-flora in the rumen due undoubtedly to the hypertonicity of the rumen fluids caused by the high concentration of solubles. The urea then acts as a cathartic and diuretic and is even more rapidly evacuated from the rumen and rendered unavailable for protein production.

Thus the consensus among the workers in this field is that only about 25% to 33⅓% of the protein in animal fodders (whether intended for increasing the weight of growing animals or as a milk-producing ration in dairy herds) may be substituted by the equivalent in the form of urea. (One pound of urea (46% nitrogen) is theoretically equivalent to slightly less than three pounds of protein (16% nitrogen). In practice, an additional factor must be introduced, i. e. the relative availabiity of urea (or other non-protein nitrogen supplements) as compared to the relative availability of the natural protein to the animal. Thus, when 79% of the nitrogen in casein and 62% of the nitrogen in urea are available for protein production, the relative protein equivalencies of the two compounds are about 2.26 lbs. casein equivalent to one pound urea).

In the case of ammoniated molasses, the producers do not advise the substitution of more than one-sixth of the protein in the animal fed by the protein equivalent of the ammoniated molasses.

To overcome this too-rapid solubility of the urea and other non-protein nitrogen compounds in feeds for ruminant animals, Turner (to American Dairies, Inc.), U. S. Patent 2,560,830 (1951), advises coating the urea and other components of the fodder with a high melting fat, in order to retard the solution of the soluble compounds in the rumen fluids.

The purpose of this invention is to provide a simpler and more effective solution for this difficulty.

It is a further purpose of this invention to provide an inexpensive, cheaply preparable non-protein nitrogenous product which can be used as a protein replacement or supplement in feeds and fodders for ruminant animals to a considerably greater extent than urea can be used and which may substitute for the more expensive protein components of fodders now used to a greater extent than is now possible with urea.

When urea is heated, in the absence of catalysts, at a temperature between 120° C. and 205° C., at atmospheric, sub-atmospheric or super-atmospheric pressures, a series of autocondensation reactions occur, with the elimination of gaseous ammonia. The major product formed by these auto-condensation reactions is biuret, M. P. 190°–193° C.

(a)  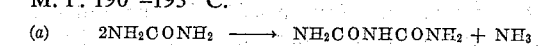

Other autocondensation products formed in amounts varying from traces to several percentages in the above reaction are:

(b) Triuret, M. P. 231° C.;

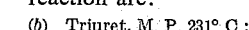
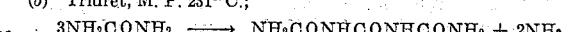

(c) Tetrauret, M. P. 186° C.;

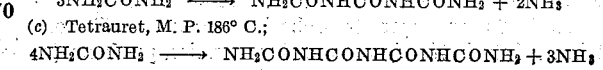

(d) Pentauret, M. P. 235° C.;

$$5NH_2CONH_2 \longrightarrow NH_2CONHCONHCONHCONHCONH_2 + 4NH_3$$

(e) Cyanuric acid, M. P. 360°–370° C. (decomp.);

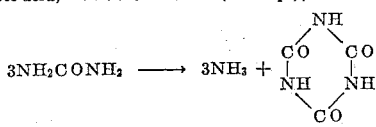

(f) Ammelid, M. P. 170°–175° C. (decomp.);

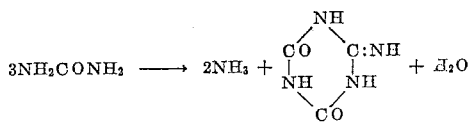

(g) Ammonium cyanate, M. P. 80°–81° C. (decomp.);

$$NH_2CONH_2 \longrightarrow NH_4CNO$$

(h) Ammeline, M. P. 200°–210° C. (decomp.);

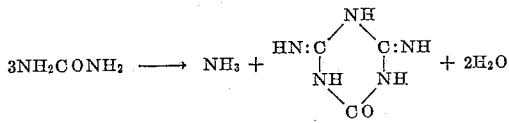

(References: Wiedemann, Jour. prakt. Chem. (1) 43, 277 (1848); Annalen, der Physik, 74, 78 (1848); Annalen der Chemie 68, 325 (1848); Hofmann, Berichte 4, 262 (1871); Schiff, Annalen 299, 236 (1898); Wohler, Ann. der Physik, 15, 622 (1828); Annales de Chimie (2), 43, 67 (1830); Hantzsch & Bauer, Berichte 38, 1010 (1905); Wohler & Liebig, Annalen 54, 371 (1845), 57, 114 (1847) and 58, 255 (1847); Escales & Koepke, Journ. prakt. Chem. (2), 87, 272 (1913); Werner, Journ. Chem. Soc. (London) 103, 1019, 2276 (1913); Escales, Chemiker Zeit. 35, 595 (1911); Matignon & Frejacques, Ann. chim. (9), 17, 302 (1922); Haworth & Mann, Journ. Chem. Soc. (London), 1943, 603; Kralovec & Huffman, U. S. Patent 2,592,809 (1952); Beckham, U. S. Patent 2,572,587 (1951); Harmon, U. S. Patent 2,145,392 (1939); Olin, U. S. Patent 2,370,065 (1945), and Sonn, German Patent 726,290 (1942).)

In the specification and claims of this patent application, the term "ureau autocondensation products" refers to this mixture of biuret, triuret, tetrauret, pentauret, cyanuric acid, ammelid, ammonium cyanate and ammeline, with biuret as the major component of said mixture, obtained by the autocondensation of urea. Depending on the method used for the autocondensation of the urea, one or more of the components listed above (other than biuret) may be absent from said mixture, or present in undetectable traces. This in no way changes or influences the suitability of these mixtures for use as protein supplements or extenders for ruminant feeds; and I include such variants, in which biuret is still the predominant component, within the class of materials here designated as "urea autocondensation products."

The basis of this invention is the finding that the urea autocondensation products described above may be fed to ruminant animals in considerably higher amounts than can urea, that the urea autocondensation products described above are retained longer in the rumens of such animals, that they do not destroy or inactivate the microflora of the rumens and that they gradually are made available by chemical and enzymatic action in the rumens of the host animals as sources of assimilable nitrogen for protein production. Thus, considerably more of the protein equivalent in the rations of ruminant animals may be supplied in the form of the urea autocondensation products of this invention than can now be supplied in the form of urea.

The product obtained by heating urea at a temperature between 120° C. and 205° C., at atmospheric, subatmospheric or super-atmospheric pressures, will contain 30% to 70% of urea autocondensation products (as defined above), the remaining 70% to 30% being unreacted urea (depending on the method used to effect the autocondensation reaction). This mixture may be used directly, without further treatment, as protein supplement in animal feed, combining the rapidly assimilated, soluble urea with the slowly assimilated, relatively insoluble, autocondensation products of urea.

Best results as a slowly absorbed "depot" protein supplement of prolonged availability are obtained by adjusting the proportions of the urea autocondensation products to the unreacted urea, whenever necessary, until the mixture contains 60% to 90% of urea autocondensation products, the remainder being urea. This may be done very simply by extracting the reaction mixture, when necessary, with a solvent for urea which is a relatively poor solvent or non-solvent for the urea autocondensation products, especially for the biuret which is the major component of the urea autocondensation products. The best such solvent is water. Urea will dissolve in water to the extent of 78% at 5° C., 100% at 17° C., 110% at 21° C. and in all proportions at 100° C., whereas biuret dissolves in water to the extent of 1.25% at 0° C., 1.5% at 15° C., and 45% at 106° C. The other urea autocondensation products are also poorly soluble or insoluble in water. Methanol, ethanol and other polar solvents are useful but less suitable for the extraction of the urea from the reaction mixture.

The reaction mixtures containing the urea autocondensation products together with unreacted urea are extracted with water, preferably at low temperatures, until sufficient urea has been leached from the reaction mixture to bring the proportion of the urea autocondensation products up to the desired 60% to 90% of urea autocondensation products with the remainder comprising unreacted urea in the residual mixture. Obviously, if desired, all of the urea may be extracted to yield a protein feed supplement containing almost entirely urea autocondensation products, with little or no urea. Such a product may be used in conjunction with an inexpensive source of readily soluble, instantly available non-protein nitrogen (e. g. ammoniated molasses, ammoniated beet pulp, ammonium bicarbonate, ammonium lactate). In such a mixture, the urea autocondensation products have the sole function of providing the slowly liberated, "depot" nitrogen, whereas the other nitrogenous additives provide the immediately available nitrogen.

In the specification and claims of this patent application, the term "urea auto-condensate" refers to the mixture of 30% to 100% of urea autocondensation products and urea comprising the remainder (if any), obtained by the autocondensation of urea (as above described), whether or not such product is subsequently leached with a urea solvent to increase the proportion of urea autocondensation products to urea in the mixture.

This process for the manufacture of protein extenders for animal feeds is ideally suited for operation in conjunction with a plant for the manufacture of urea by the high pressure reaction of ammonia and carbon dioxide. The ammonia gas evolved during the autocondensation reaction of the urea may be piped off and returned to the urea process by being fed to the ammonia compressors. If the urea autocondensate is extracted with water to increase the proportion of urea autocondensation products to urea, the aqueous extract containing the excess urea may simply be returned to the crystallizers in the urea process, to recover the urea content thereof. The urea so recovered (possibly containing traces of the autocondensation products) may then be returned for reuse in the process of this invention. Thus, substantially all of the urea used as a raw material is converted to the urea autocondensate protein supplement products of this invention.

The following examples and test results are given to define and to illustrate this invention, but in no way to limit it to reagents, proportions, conditions, applications or to imply that all results obtained will be identical to those described herein. Obvious modifications will occur to any person skilled in the art.

Example I

Technical urea is melted without overheating (130°–135° C.) and the melt is vigorously agitated at a temperature of 125°–135° C. for a period of eight to nine hours, or until the melt becomes too stiff to agitate (by virtue of biuret formation). The ammonia evolved during this reaction period is conducted off to the ammonia compressors in the urea plant. The reaction mixture is now allowed to cool, and is then comminuted to any desired particle size by grinding. From 1000 parts by weight of urea, there is thus obtained 883 parts of the new protein extender for animal feeds of this invention. 117 parts of ammonia are recovered. The urea autocondensate contains 30% of unreacted urea and 70% of urea autocondensation products. The urea autocondensation products contain 83% of biuret and 17% of the other compounds (as above described). This product, the mixture of unreacted urea and urea autocondensation products, is the "Urea Autocondensate A" referred to in the tests below.

This product is ground to 100 mesh fineness. One hundred parts by weight of this ground product are mixed for one hour with 12 parts by weight of water at 17°–20° C., and the reaction mixture is then centrifuged. The liquid extract (24 parts of a 50% w/w urea solution) is sent to the crystallizers in the urea plant. The crystalline residue contains 88 parts of a mixture consisting of 80% of urea autocondensation products and 20% of urea. This is the Urea Autocondensate "B" referred to in the tests below.

Alternatively, the 100 mesh Urea Autocondensate A is mixed for one hour with 22 parts of water at 17°–20° C., and the reaction mixture is then centrifuged. The liquid extract comprises 44 parts of a 50% w/w urea solution. The crystalline residue contains 78 parts of a mixture consisting of 90% of urea autocondensation products and 10% of urea. This is Urea Autocondensate "C."

Example II

In a series of controlled experiments, the protein in a basic fodder used for fattening yearling Hereford steers was substituted by increasing amounts of the urea autocondensate "A" of this invention (q. v. supra) (containing about 30% urea and 70% urea autocondensation products). The average daily feed per steer (which included carbohydrate yielding material as its major component) consisted of:

| | Pounds |
|---|---|
| Shelled corn | 16.00 |
| Cane molasses | 1.00 |
| Chopped hay | 2.50 |
| Whole hay | 2.50 |
| Mineral mixture | 0.06 |
| Block salt | 0.02 |
| Protein equivalent | 4.00 |

The mineral mixture consisted of 30% salt, 20% ground limestone, 35% steamed bone meal and 15% Trace Mineral Premix for ruminants (Commercial Solvents Corporation).

The protein equivalent was fed as soybean oil meal cake (38% digestible protein) or as mixtures of soybean oil meal cake and the urea autocondensation products of the invention. The protein equivalency of the urea autocondensation products are calculated on the basis of total nitrogen content multiplied by the factor of 6.25.

The following results were obtained:

TABLE I

| No. of Steers | 3 | 3 | 3 | 3 | 3 | 3 | 3 |
|---|---|---|---|---|---|---|---|
| Percent of protein derived from soybean cake | 100 | 83⅓ | 66⅔ | 50 | 33⅓ | 20 | |
| Percent of protein derived from urea auto-condensate "A" | | 16⅔ | 33⅓ | 50 | 66⅔ | 80 | 100 |
| Average gain per steer in 200 day feeding experiment, lbs. | 504 | 512 | 496 | 504 | 480 | 336 | Discontinued |
| Average daily gain per steer, lbs. | 2.52 | 2.56 | 2.48 | 2.52 | 2.40 | 1.68 | Do. |

All of the steers dressed down to U. S. Prime or Choice carcass grades.
The substitution of more than 80% of the protein by the urea autocondensation products caused the animals to go "off feed," and the experiment was discontinued. Water was allowed to the animals ad lib.

Example III

In a series of controlled experiments, the protein in a basic fodder used for a dairy herd of Holstein cows was substituted by increasing amounts of the urea autocondensate "B" product (q. v. supra) (containing about 20% urea and 80% urea autocondensation products). The average daily feed per cow, again containing carbohydrate yielding material as its major component, consisted of:

| | Pounds |
|---|---|
| Shelled corn | 4.75 |
| Ground oats | 4.75 |
| Cane molasses | 1.00 |
| Mineral mixture | 0.06 |
| Block salt | 0.02 |
| Timothy hay | 10.00 |
| Corn silage | 30.00 |

This basic ration contained about 1.25 lbs. of protein. This protein intake was raised up to 4.25 lbs. daily by feeding soybean oil meal cake and mixtures of soybean oil meal cake and the urea autocondensate "B" product of this invention in varying proportions.

The following results were obtained:

TABLE II

| No. of cows | 2 | 2 | 2 | 2 | 2 | 2 | 2 |
|---|---|---|---|---|---|---|---|
| Percent of added protein derived from soybean cake | 100 | 83⅓ | 66⅔ | 50 | 33⅓ | 20 | |
| Percent of added protein derived from urea autocondensate "B" (percent N×6.25=percent protein equivalent) | | 16⅔ | 33⅓ | 50 | 66⅔ | 80 | 100 |
| Daily milk yield (4% fat-corrected basis), pounds | 27.4 | 28.8 | 30.1 | 29.4 | 28.8 | 18.2 | Discontinued |

The substitution of more than 80% of the added protein by the urea autocondensation product caused the animals to go "off feed," and the experiment was discontinued. The cows have access to water ad lib, and were milked twice daily over the test period of 48 days.

From the above experiments, it can be seen that the urea autocondensation products of this invention are capable of supplying as much as two-thirds of the equivalent protein both in cattle fattening rations and in dairy rations for milk production. Equivalent weight gains and equivalent daily milk production are obtained when up to two-thirds of the protein in oil cake fodder supplements is replaced by the equivalent in the form of urea autocondensation products. No toxic effects on the experimental animals were noted over the periods of the experiments.

Thus, whereas:

(a) Only about 16⅔% of the equivalent protein requirements in feeds for raising and fattening cattle and for milk production in dairy herds may be supplied in the form of ammoniated molasses, and (b) Only from 25% to 33⅓% of the equivalent protein requirements in such feeds can be supplied in the form of urea, (c) As much as 66⅔% of the equivalent protein requirements in such feeds can be supplied in the form of the urea autocondensates of this invention.

Feeding experiments with sheep and other ruminants indicate results comparable to those obtained with cattle.

The protein supplements or extenders of this invention may be incorporated into ruminant fodders in any desirable physical form and may be admixed with molasses, as well as with other components of animal fodders, such as protein cake, urea, ammoniated molasses, ammoniated beet pulp, salt, mineral mixtures, feed supplements of any nature whatever, antibiotics, vitamins, hormones, estrogenic substances, etc. They may be compressed or tabletted into cakes, blocks, tablets, rods, disks, etc., with or without the addition of binding agents such as casein or other proteins, glues, waxes, resins, starches, fats, etc.

In co-pending patent application Serial No. 317,600, I have described and claimed a group of slowly absorbed, nitrogenous "depot" fertilizers largely based on the urea autocondensation products of this invention.

Having described my invention, what I claim and desire to protect by Letters Patent is:

1. A process for the manufacture of protein supplements for ruminant feed which comprises (1) heating urea at a temperature between 120° and 205° C. to effect substantial autocondensation of the urea to produce a mixture of unreacted urea and urea autocondensation products in which the urea constitutes 30% to 70% of the total mixture and in which the said autocondensation products include biuret as a predominant component together with a minor amount of one or more compounds of the class consisting of triuret, tetrauret, pentauret, cyanuric acid, ammelid, ammeline and ammonium cyanate; and (2) extracting a part of the unreacted urea by means of a selective solvent for urea to leave a protein supplement product containing 60% to 90% of said admixed autocondensation products, the remainder being urea.

2. A process of making a ruminant feed which comprises mixing a carbohydrate yielding material, as a major component of the feed, with a protein supplement which is the product of the process of claim 1.

3. Protein supplements for ruminant feeds containing a mixture of urea and urea autocodensation products, the said autocondensation products constituting 30% to 90% of the mixture of urea and said autocondensation products and including a predominance of biuret together with a minor but substantial amount of one or more compounds of the class consisting of triuret, tetrauret, pentauret, cyanuric acid, ammelid, ammeline and ammonium cyanate.

4. Protein supplements for ruminant feeds containing a mixture of urea and urea autocondensation products, the said autocondensation products constituting 50% to 90% of the mixture of urea and said autocondensation products and including a predominance of biuret together with a minor but substantial amount of one or more compounds of the class consisting of triuret, tetrauret, pentauret, cyanuric acid, ammelid, ammeline and ammonium cyanate.

5. Protein supplements for ruminant feeds containing a mixture of (a) water soluble, readily available nitrogenous compounds convertible to protein by the microflora of animal rumens and (b) urea autocondensation products, the said autocondensation products constituting 30% to 90% of the said mixture and including a predominance of biuret together with a minor but substantial amount of one or more compounds of the class consisting of triuret, tetrauret, pentauret, cyanuric acid, ammelid, ammeline and ammonium cyanate.

6. A ruminant feed containing carbohydrate yielding material as a major component and a protein supplement mixture of urea and urea autocondensation products, the said autocondensation products constituting 30% to 90% of the said mixture of urea and urea autocondensation products and including a predominance of biuret together with a minor but substantial amount of one or more compounds of the class consisting of triuret, tetrauret, pentauret, cyanuric acid, ammelid, ammeline and ammonium cyanate.

7. A ruminant feed containing carbohydrate yielding material as a major component and a protein supplement mixture of urea and urea autocondensation products, the said autocondensation products constituting 60% to 90% of the said mixture of urea and urea autocondensation products and including a predominance of biuret together with a minor but substantial amount of one or more compounds of the class consisting of triuret, tetrauret, pentauret, cyanuric acid, ammelid, ammeline and ammonium cyanate.

8. A ruminant feed containing carbohydrate yielding material as a major component together with a protein supplement mixture as defined in claim 5.

References Cited in the file of this patent
UNITED STATES PATENTS

| | | |
|---|---|---|
| 2,145,392 | Harmon | Jan. 31, 1939 |
| 2,592,565 | Harvey | Apr. 15, 1952 |
| 2,630,386 | Walker | Mar. 3, 1953 |
| 2,687,354 | Gribbins | Aug. 24, 1954 |